United States Patent
Roy et al.

(10) Patent No.: US 7,796,536 B2
(45) Date of Patent: Sep. 14, 2010

(54) DYNAMIC AUTO-RECONFIGURABLE TIME DIVISION MULTIPLE ACCESS

(75) Inventors: Aloke Roy, Gaithersburg, MD (US); Dongsong Zeng, Germantown, MD (US); Arun V. Mahasenan, Bangalore (IN); Vinayak S. Kore, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 692 days.

(21) Appl. No.: 11/550,009

(22) Filed: Oct. 17, 2006

(65) Prior Publication Data

US 2008/0089311 A1    Apr. 17, 2008

(51) Int. Cl.
 *H04L 12/28* (2006.01)
(52) U.S. Cl. .................................. 370/254; 370/316
(58) Field of Classification Search ................. 370/316, 370/317, 331, 332, 254; 455/436, 437
See application file for complete search history.

(56) References Cited

U.S. PATENT DOCUMENTS

| | | | | |
|---|---|---|---|---|
| 6,885,674 B2* | 4/2005 | Hunt et al. | ................... | 370/420 |
| 7,289,472 B2* | 10/2007 | Yano et al. | ................... | 370/331 |
| 7,394,780 B1* | 7/2008 | Gregory et al. | ............. | 370/316 |
| 7,460,559 B2* | 12/2008 | Pendergrass et al. | ........ | 370/478 |
| 2003/0063585 A1 | 4/2003 | Younis et al. | | |
| 2005/0122231 A1 | 6/2005 | Varaiya | | |
| 2005/0282573 A1 | 12/2005 | Maeno | | |
| 2006/0092864 A1 | 5/2006 | Gupta et al. | | |

FOREIGN PATENT DOCUMENTS

| | | |
|---|---|---|
| EP | 1628446 | 2/2006 |
| EP | 1615402 | 11/2006 |
| WO | 9717769 | 5/1997 |
| WO | 2006020800 | 2/2006 |
| WO | 2006095323 | 9/2006 |

OTHER PUBLICATIONS

International Searching Authority, "International Search Report", Aug. 22, 2008, Published in: WO.

* cited by examiner

*Primary Examiner*—Dang T Ton
*Assistant Examiner*—Wei Zhao
(74) *Attorney, Agent, or Firm*—Fogg & Powers LLC

(57) ABSTRACT

A method to dynamically reconfigure a network by receiving a data packet for transmission from a node in the network at a media access control layer of the node and determining a slot assignment for the data packet based on an application required quality of service. The application required quality of service is determined based on at least one of a number of slots required by the data packet, an application-specified data rate, an application-specified delay requirement and an application-specified number of reserved retries, and application-associated priority values for the data packet. The media access control layer is enabled for time division multiple access.

10 Claims, 10 Drawing Sheets

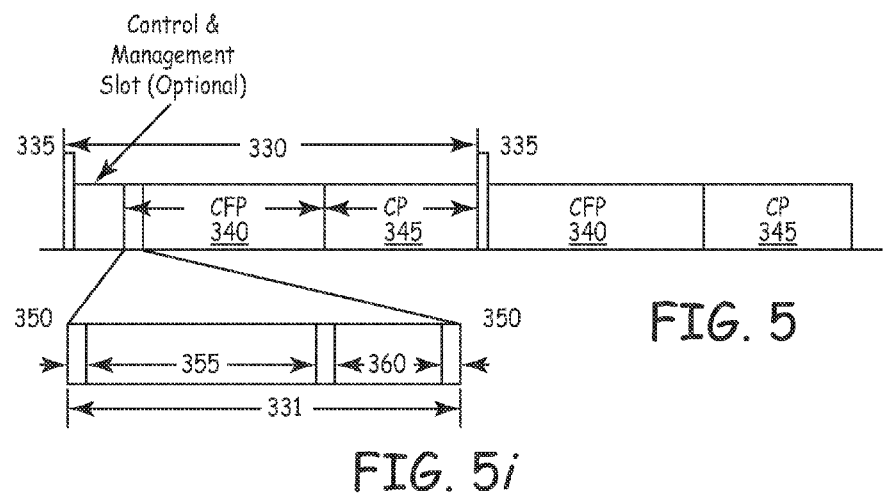
FIG. 5
FIG. 5i
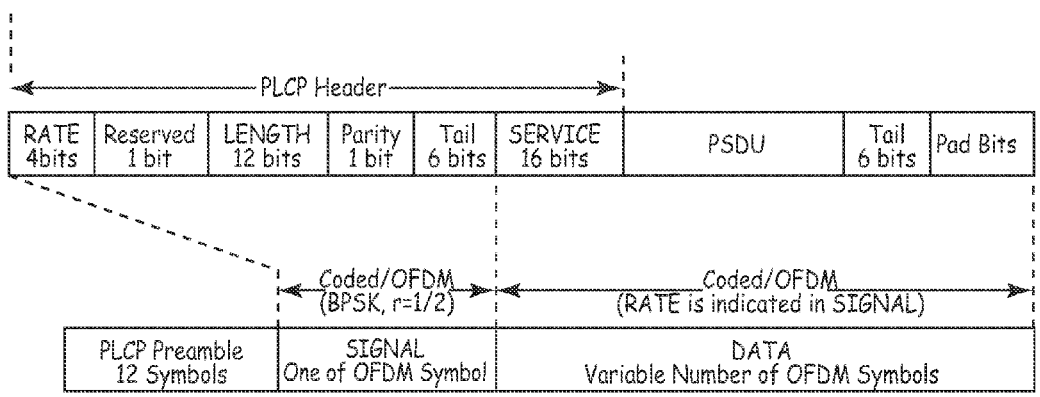
FIG. 6

US 7,796,536 B2

DYNAMIC AUTO-RECONFIGURABLE TIME DIVISION MULTIPLE ACCESS

This application is related to U.S. patent application Ser. No. 11/381,021 having a title of "DETERMINISTIC POWER-AWARE WIRELESS NETWORK" (also referred to here as "the 021 Application") filed on May 1, 2006. The 021 application is hereby incorporated herein by reference.

BACKGROUND

Typical commercial off the shelf (COTS) wireless devices do not meet the electromagnetic interference/radio frequency interference, environmental and certification requirements of most aerospace applications. These COTS wireless products require significant human intervention to configure them for every operational scenario. Widely deployed wireless technologies, including Institute of Electrical and Electronics Engineers (IEEE) 802.11 and IEEE 802.15.4, use carrier sensing multiple access with collision avoidance (CSMA/CA) techniques for channel access. Although CSMA/CA techniques are well-known to be suitable for variable and unpredictable traffics, they suffer from severe control overhead when the traffic is predictable or regular. In addition, current 802.11 and 802.15.4 have no Quality of Service (QoS) guarantees due to the probabilistic nature of CSMA/CA and no prioritization among wireless nodes. IEEE Standard 802.11e includes a QoS extension to 802.11. In 802.11e, the traffic priority is differentiated by Traffic Categories (TCs) and the QoS is managed by two operation modes: (1) enhanced distributed coordination function (EDCF); and (2) hybrid coordination function (HCF). Even though 802.11e provides better medium access probability to higher priority traffic at the price of high control overhead, it still does not provide any QoS guarantees to the applications.

In most aerospace applications, the data traffic, such as video, audio, sensor/actuator data, and real-time control signal, are predictable or regular. Furthermore, some data traffics, such as control signals and sensor/actuator data, usually demand some type of guaranteed QoS.

It is difficult to optimize the user of resources to maximize network throughput and to minimize network energy consumption. As the network size increases, the computation of the optimal solution becomes prohibitively complex. Some wireless Time Division Multiple Access (TDMA) technologies, e.g., Bluetooth and low energy adaptive clustering hierarchy (LEACH), start with generic applications of random data traffic and optimize the resources for either throughput or energy conservation or both. In order to be computable, Bluetooth and LEACH make assumptions, which impose limitations on their applications.

For instance, Bluetooth is limited to eight active nodes in a cluster. LEACH is an energy efficient protocol for wireless sensor network, which is a mixture of CSMA, TDMA and code division multiple access (CDMA).

In LEACH, the advertisement phase and cluster set-up phase use CSMA, the schedule creation and data transmission use TDMA. The nodes inside one cluster communicate to each other using a CDMA code that is different from the CDMA code of nearby clusters in order to avoid signal corruption from the nearby clusters. In addition to its algorithmic complexity, LEACH assumes that each node knows a priori the optimum average number of clusters for the network. This assumption makes LEACH unable to adapt to dynamically changing network topology.

The data rate adaptation for TDMA technologies is done based on the detected packet errors. The transmitter switches to a higher transmission rate after a certain number of successful transmissions and changes to a lower rate after a fixed number of consecutive failures. This packet error method wastes resources since there are failures from periodically attempting higher data rate.

SUMMARY

The present invention describes a method to dynamically reconfigure a network by receiving a data packet for transmission from a node in the network at a media access control layer of the node and determining a slot assignment for the data packet based on an application required quality of service. The application required quality of service is determined based on at least one of a number of slots required by the data packet, an application-specified data rate, an application-specified delay requirement and an application-specified number of reserved retries, and application-associated priority values for the data packet. The media access control layer is enabled for time division multiple access.

DRAWINGS

FIG. 5 is a block diagram of a super-frame and a slot duration structure in accordance with the present invention.

FIG. 5i is a slot duration structure in accordance with the present invention.

FIG. 6 is an exemplary physical layer convergence procedure frame format.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1A:
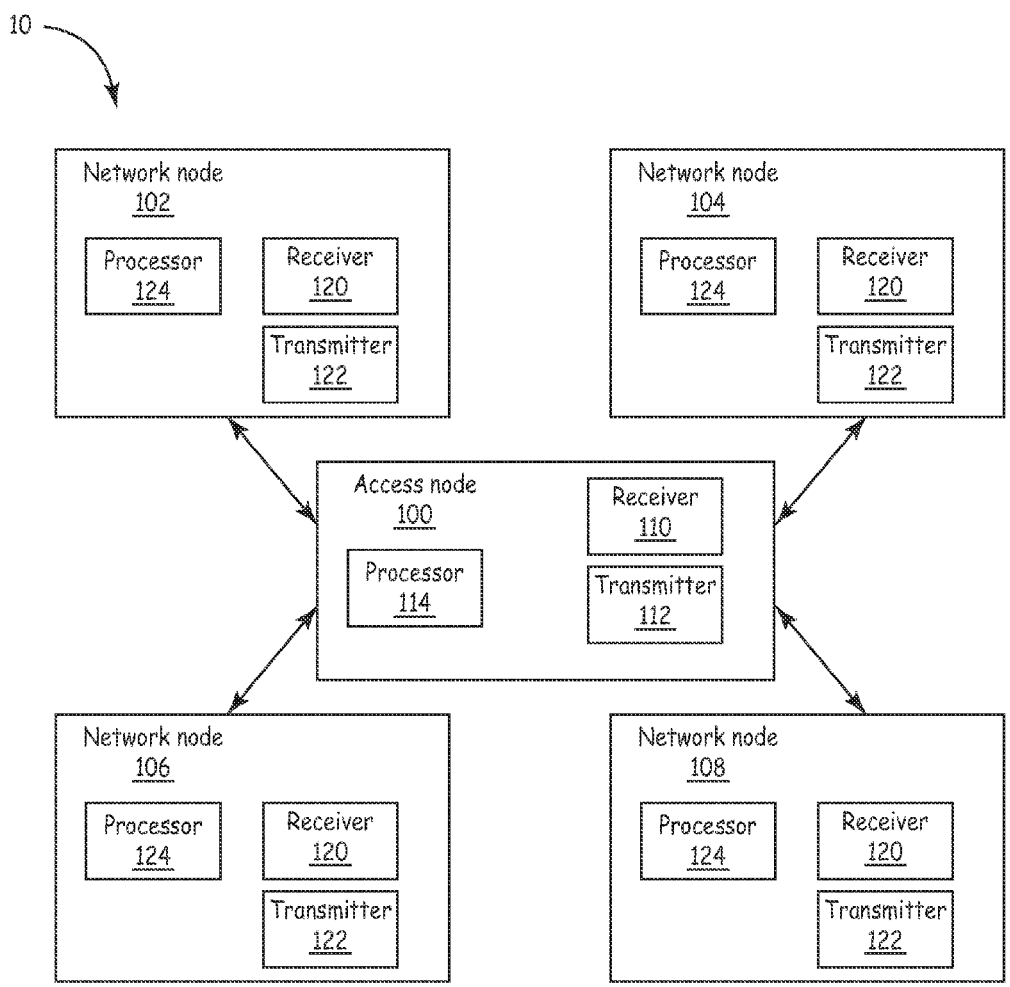
FIG. 1A is a block diagram of an embodiment of a wireless dynamic auto-reconfigurable time division multiple access managed network in accordance with the present invention.

FIG. 1A is a block diagram of an embodiment of a wireless dynamic auto-reconfigurable time division multiple access managed network 10 in accordance with the present invention. The wireless dynamic auto-reconfigurable time division multiple access (DA-TDMA) managed network 10, also referred to here as "network 10," includes an access node 100 in wireless communication with a plurality of network nodes 102-108 also referred to here as "network nodes 102-108." Network 10 is configured in a star topology. The access node 100 includes one or more processors 114, a receiver 110 and a transmitter 112. In one implementation of this embodiment, the receiver 110 and transmitter 112 are one device such as a transceiver. In another implementation of this embodiment, the network nodes 102-108 include sensors. In yet another implementation of this embodiment, least one of the processors 124 is a power-aware processor as described in the 021 application.

The network nodes 102-108 include one or more processors 124, a receiver 120 and a transmitter 122. The network nodes 102-108 each interface with at least one type of physical layer. In one implementation of this embodiment, the receiver 120 and transmitter 122 are one device referred to as a "transceiver." In another implementation of this embodiment, the network nodes 102-108 include sensors. In yet another implementation of this embodiment, at least one of the processors 124 is a power-aware processor as described in the 021 application.

By way of example and not by way of limitation, the term "wireless communication" includes a wireless connection via various devices and components implemented according wireless communication standards including IEEE 801.11, IEEE 801.15, IEEE 801.16, and 802.15.4a. The network nodes 100-108 transmit data in data packets. The linked nodes are also referred to here as "communicatively coupled nodes" in which the wireless connection is used in the exchange of information.

In one implementation of this embodiment, one or more of the network nodes 102-108 are wireless sensors that detect environmental parameters from the local environment of the network nodes 102-108. In another implementation of this embodiment, the wireless DA-TDMA managed network 10 is a wireless local area network (LAN) without sensor nodes.

Figure 1B:
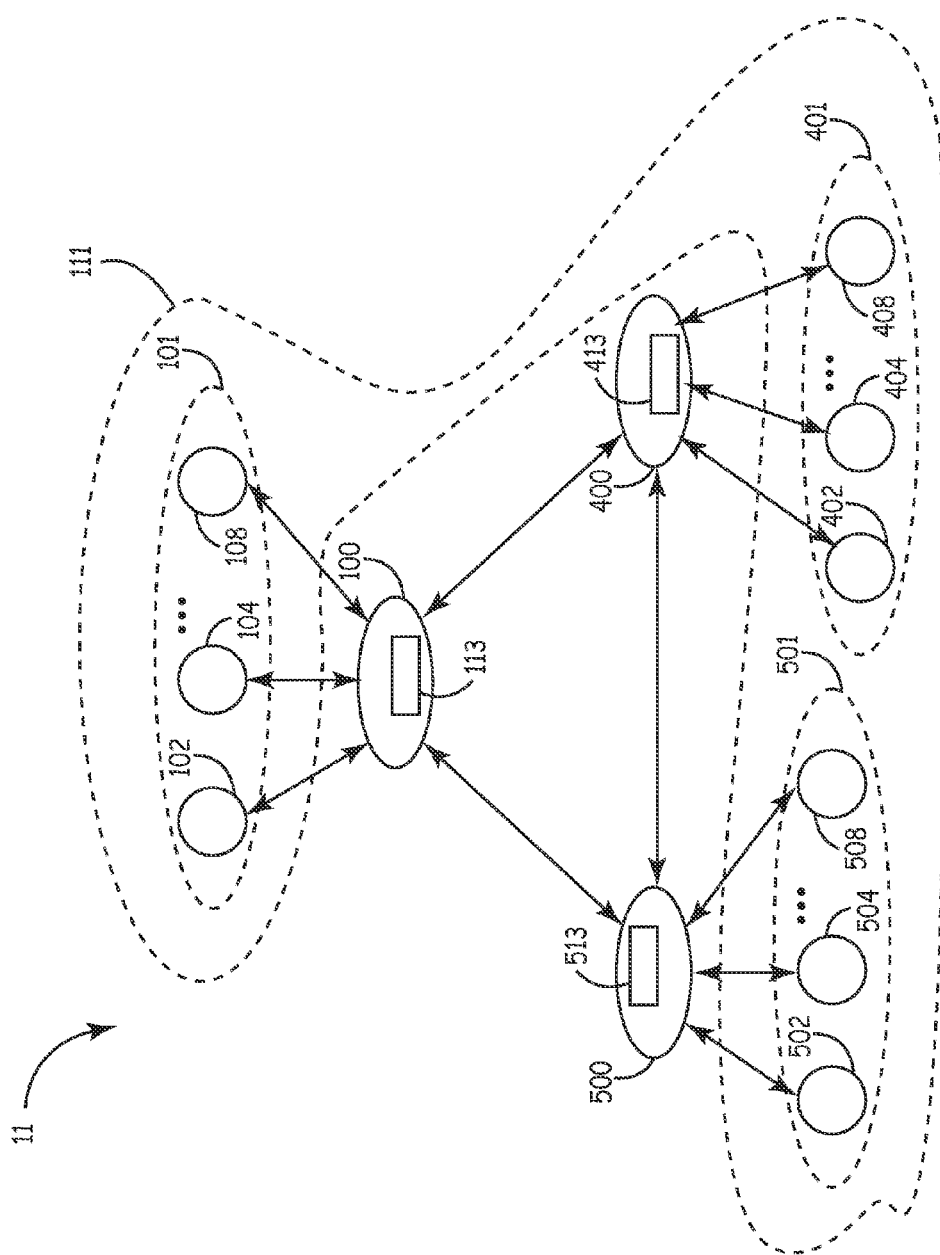
FIG. 1B is a block diagram of an embodiment of a wireless dynamic auto-reconfigurable time division multiple access managed network in accordance with the present invention.

FIG. 1B is a block diagram of an embodiment of a wireless dynamic auto-reconfigurable time division multiple access (DA-TDMA) managed network 11 in accordance with the present invention. The wireless DA-TDMA managed network 11, also referred to herein as "network 11," is configured as a mesh-network topology. The DA-TDMA managed network 11, includes a plurality of access nodes 100, 400, and 500 that are each communicatively coupled to a non-overlapping subset of the plurality of network nodes represented generally by the numeral 111. The non-overlapping subsets are represented generally by the numerals 101, 401, and 501. The subset 101 includes network nodes 102, 104, and 108. The subset 401 includes network nodes 402, 404, and 408. The subset 501 includes network nodes 502, 504, and 508. Since the subsets 101, 401, and 501 do not overlap one another, each network node 102, 104, 108, 402, 404, 408, 502, 504, and 508 is controlled by only one access node 100, 400 or 500.

The access nodes 100, 400 and 500 include one or more processors 114, a receiver 110 and a transmitter 112 as described above with reference to FIG. 1A. The network nodes 102, 104, 108, 402, 404, 408, 502, 504, and 508 include one or more processors 124, a receiver 120 and a transmitter 122 as described above with reference to FIG. 1A.

The network nodes 102, 104, 108, 402, 404, 408, 502, 504, and 508 are interfaced to at least one type of physical layer. A media access control layer is in each of the network nodes 102, 104, 108, 402, 404, 408, 502, 504, and 508 and the access nodes 100, 400 and 500.

As shown in FIG. 1B, each of the access nodes 100, 400 and 500 in the network 11 includes a router 113, 413 and 513, respectively, to communicatively couple to the other access nodes 100, 400 and 500 in the network 11 at a first frequency. Each of the access nodes 100, 400 and 500 is communicatively coupled to one of the non-overlapping subsets 101, 401 and 501, respectively, of the plurality of network nodes 111 at a second frequency. In this manner, the media access control of the mesh-network is controlled by a combination of TDMA and frequency division multiple access (FDMA).

In one implementation of this embodiment, each of the access nodes 100, 400 and 500 in the network 11 is communicatively coupled to the other access nodes (via respective routers 113, 413 and 513) and to the non-overlapping subsets 101, 401 and 501 at one frequency. In this manner, the media access control of the mesh-network is controlled by a TDMA without FDMA. If the plurality of access nodes is reduced to a single access node, then all the network nodes are in the subset 111 and network 11 is reduced to the star-topology configuration of network 10.

In another implementation of this embodiment, one or more of the network nodes 102, 104, 108, 402, 404, 408, 502, 504, and 508 are wireless sensors that detect environmental parameters from the local environment of the network nodes 102-108. In yet another implementation of this embodiment, the wireless DA-TDMA managed network 11 is a wireless local area network (LAN) without sensor nodes.

The DA-TDMA managed networks 10 and 11 are applicable to aerospace applications that include on-board entertainment, intelligent engine control, cable replacement, and the like. The DA-TDMA managed networks 10 and 11 reduce control overheads, improve throughput, provide guaranteed quality of service, and reduce energy consumption. The DA-TDMA managed network 10 also provides MAC layer flexibility, which automatically detects the type of underlying physical layer through management information base (MIB) interaction and runs over different physical layers, such as 802.11, 802.15.4 radios.

Figure 2A:
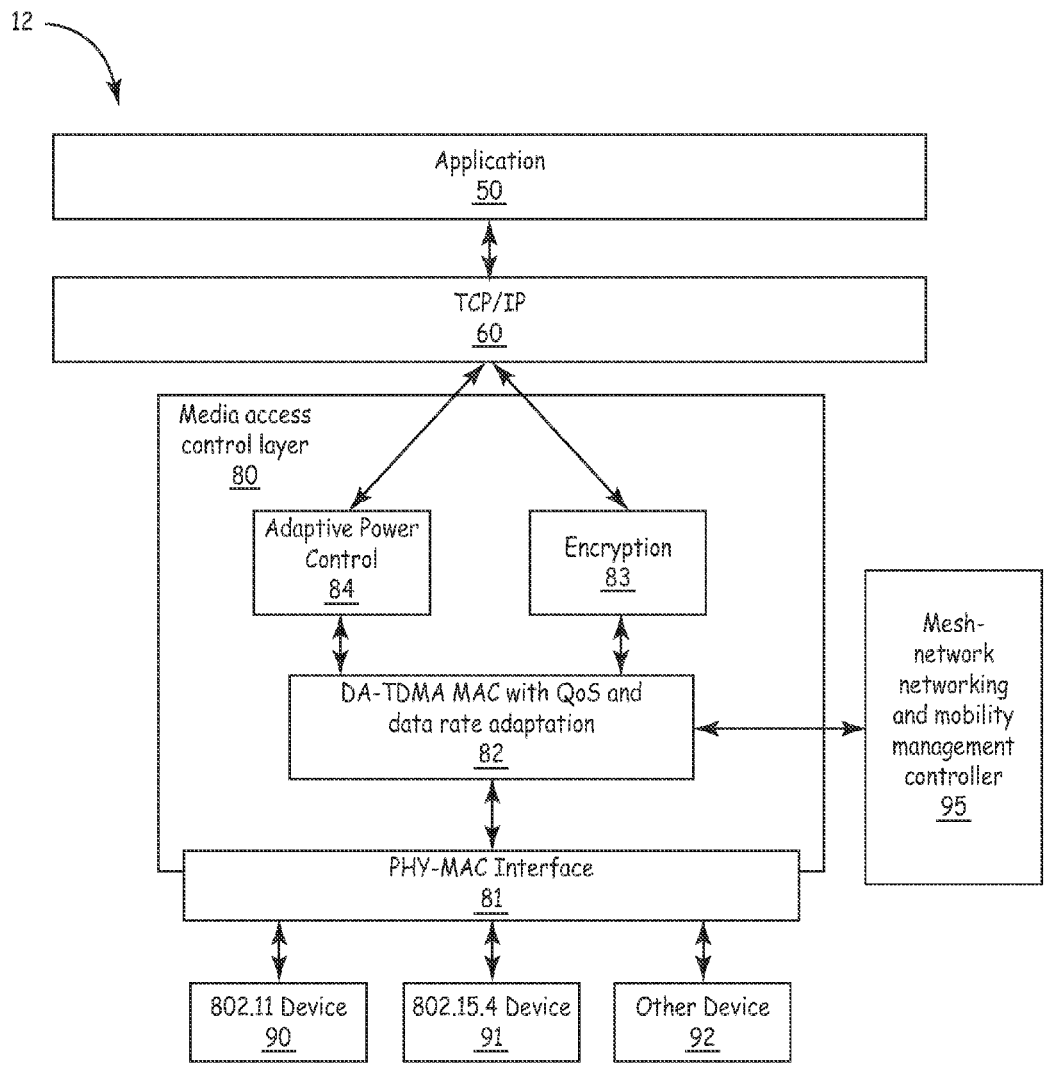
FIG. 2A is a block diagram of one embodiment of an interfaced node in a wireless dynamic auto-reconfigurable time division multiple access managed network in accordance with the present invention.

FIG. 2A is a block diagram of one embodiment of an interfaced node 12 in the wireless dynamic auto-reconfigurable time division multiple access managed network 10 in accordance with the present invention. The media access control layer 80 is communicatively coupled via a physical-media access control (PHY-MAC) interface 81 to one or more physical devices 90 that include hardware implemented according to Institute of Electrical and Electronics Engineers 802.11 standards, one or more physical devices 91 that include hardware implemented according to Institute of Electrical and Electronics Engineers 802.15.4 standards, and one or more physical devices 92 that include hardware implemented according to other standards.

The media access control layer 80 includes a DA-TDMA media access control with quality of service and data rate adaptation capability 82, also referred to herein as "TDMA 82." The media access control layer 80 also includes an adaptive power control capability 84, and an encryption capability 83. The media access control layer 80 is communicatively coupled to a mesh-network networking and mobility management controller 95, which is also referred to herein as "controller 95."

The media access control layer 80 is communicatively coupled to the transmission control protocol (TCP)/Internet protocol (IP) layer 60, also referred to herein as "TCP/IP layer 60." The transmission control protocol TCP/IP layer 60 is communicatively coupled with the application layer 50.

As shown in FIG. 2A, the media access control layer is enabled for time division multiple access. The media access control layer 80 assigns a data packet to a slot in a super-frame based on an application required quality of service. The application required quality of service is determined based on at least one of the number of slots required by the data packet, an application-specified data rate, an application-specified delay requirement, an application-specified number of reserved retries, and application-associated priority values for the data packet.

In one implementation of this embodiment, the adaptive power control capability 84 is not included in the media access control layer 80. In another implementation of this embodiment, the encryption capability 83 is not included in the media access control layer 80. In yet another implementation of this embodiment, the adaptive power control capability 84 and the encryption capability 83 are not included in the media access control layer 80. In yet another implementation of this embodiment, the power-aware capability described in the 021 application is included in the media access control layer 80. In another implementation of this embodiment, the encryption capability is in the application layer 50 as described in the 021 application. In one implementation of embodiments of networks 10 and 11, the access nodes and network nodes interface with physical devices and other nodes in the network as shown in FIG. 2A.

Figure 2B:
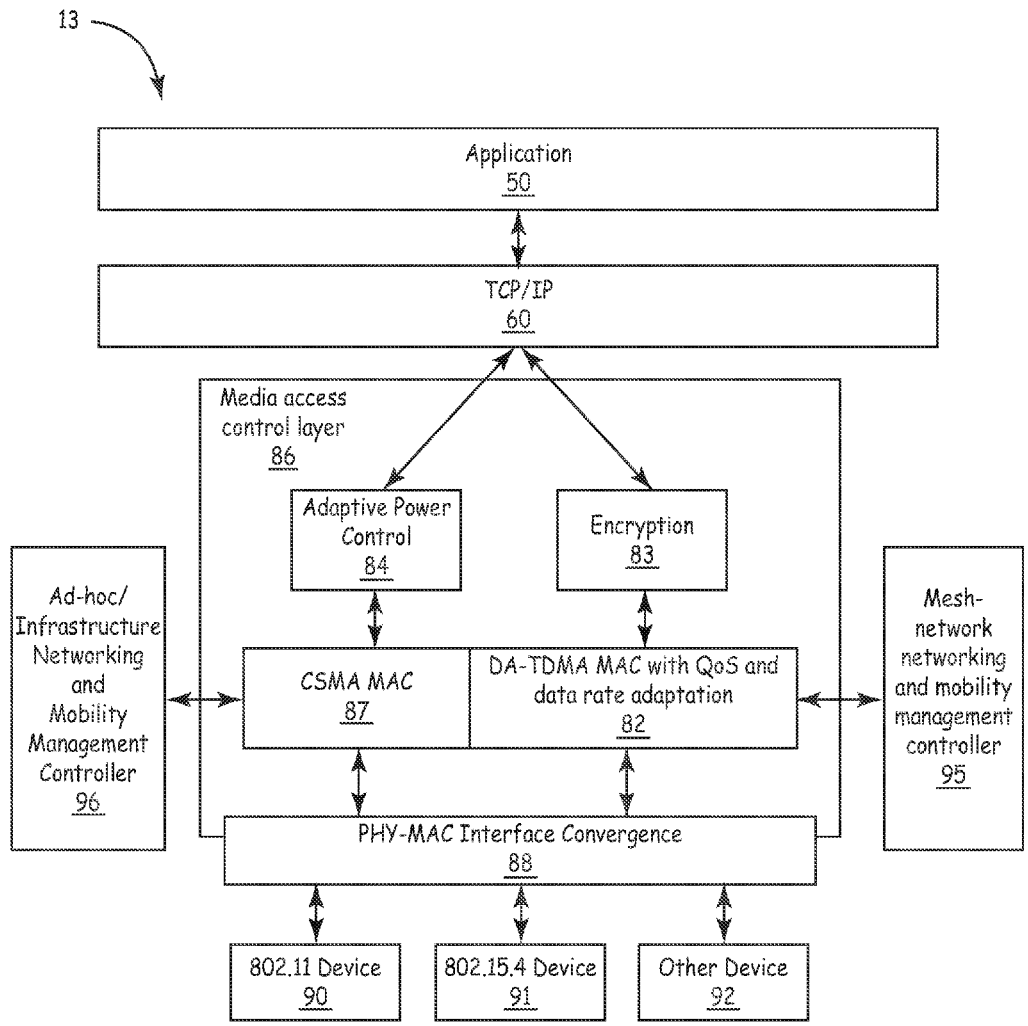
FIG. 2B is a block diagram of one embodiment of an interfaced node in a wireless dynamic auto-reconfigurable time division multiple access managed network in accordance with the present invention.

FIG. 2B is a block diagram of one embodiment of an interfaced node 13 in a wireless dynamic auto-reconfigurable time division multiple access managed network in accordance with the present invention. The interface of node 13 differs from interface of node 12 in that node 13 has CSMA and/or TDMA capabilities. The media access control layer 86 is communicatively coupled via a physical-media access control (PHY-MAC) interface 88 to one or more physical devices 90, 91, 92 as described above with reference to FIG. 2A. The media access control layer 86 includes a DA-TDMA media access control with quality of service and data rate adaptation capability 82 (also referred to herein as "TDMA 82"), an adaptive power control capability 84, and an encryption capability 83 as described above with reference to FIG. 2A. The media access control layer 86 is communicatively coupled to the controller 95 via the TDMA 82.

The media access control layer 86 also includes a carrier sensing multiple access media access control capability 87, also referred to herein as "CSMA 87." The media access control layer 86 is communicatively coupled to an ad-hoc/infrastructure networking and mobility management controller 96 also referred to herein as "controller 96." The media access control layer 86 is communicatively coupled to the transmission control protocol TCP/IP layer 60. The TCP/IP layer 60 is communicatively coupled with the application layer 50.

In another implementation of this embodiment, the media access control layer 86 is enabled for TDMA or CSMA. The media access control layer 89 encrypts the data packet, adaptively controls the transmission power based on an exponentially weighted moving average calculation, and/or adaptively controls the data rate.

In one implementation of this embodiment, the adaptive power control capability 84 is not included in the media access control layer 86. In another implementation of this embodiment, the encryption capability 83 is not included in the media access control layer 86. In yet another implementation of this embodiment, the adaptive power control capability 84 and the encryption capability 83 are not included in the media access control layer 86. In yet another implementation of this embodiment, the power-aware capability described in the 021 application is included in the media access control layer 86. In another implementation of this embodiment, the encryption capability is in the application layer 50 as described in the 021 application. In one implementation of embodiments of networks 10 and 11, the access nodes and network nodes interface with physical devices and other nodes in the network as shown in Figure 2B. In another implementation of embodiments of networks 10 and 11, some of the nodes in the network 10 or 11 interface with physical devices and interface with other nodes in the network 10 or 11 as shown in FIG. 2A, while others of the nodes interface with physical devices and other nodes in the network as shown in FIG. 2B.

Figure 3:
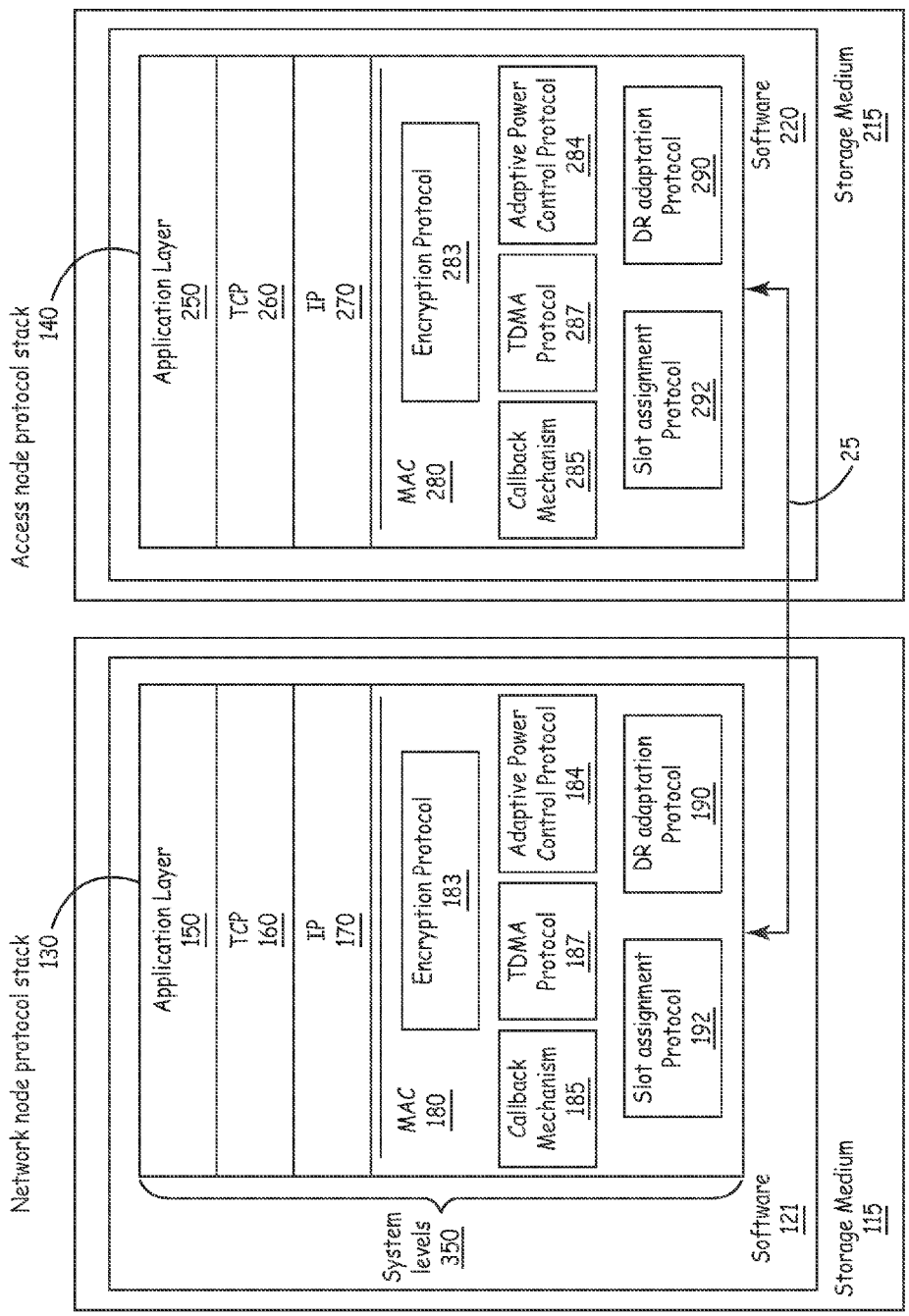
FIG. 3 is a block diagram of one embodiment of communication protocol stacks in accordance with the present invention.

FIG. 3 is a block diagram of one embodiment of communication protocol stacks 130 and 140 in accordance with the present invention. The software 220 comprises appropriate program instructions that, when executed by processors 114 in the access node 100 (FIG. 1A), cause the processor 114 to perform the processing described here as being carried out by the software 220. Such program instructions are stored on or otherwise embodied on one or more items of storage media 215 (only one of which is shown in FIG. 3).

The software 121 comprises appropriate program instructions that, when executed by processors 124 in the network nodes 102-108 (FIG. 1A), cause the processors 124 to perform the processing described here as being carried out by the software 121. Such program instructions are stored on or otherwise embodied on one or more items of storage media 115 (only one of which is shown in FIG. 3). The media access layers 180 and 280 are equivalent to the media access layers 80 and 86 in FIGS. 2A and 2B, respectively.

The communication protocol stack for the access nodes 100, 400 and 500 in FIGS. 1A and 1B is generally indicated as 140. The communication protocol stack 140 is also referred to here as "access node protocol stack 140." The communication protocol stack for network nodes 102-108 in FIG. 1A or network nodes 102, 104, 108, 402, 404, 408, 502, 504, and 508 in FIG. 1B is generally indicated as 130. The communication protocol stack 130 is also referred to here as "network node protocol stack 130." The network node protocol stack 130 and the access node protocol stack 140 both include system levels 350. Some levels of the system level 350 are not illustrated here in order to emphasize the present invention. The wireless communication link between the network node and the access node is generally indicated by the double-ended arrow 25 connecting the network node protocol stack 130 and the access node protocol stack 140. The linked nodes are also referred to here as "communicatively coupled nodes" in which the wireless communication link 25 is used in the exchange of information.

The system levels 350 of the network node protocol stack 130 include an application layer 150, a transmission control protocol (TCP) layer 160, an internet protocol (IP) layer 170, and a media access control (MAC) layer 180. The transmission power control (TPC) protocol layer 160 controls transmission power levels of the network node 102-108 in which it is located. The application layer 150 is also referred to here as "user-level 150." The media access control layer 180 is in communication with the application layer 150 of the network node 102, 104, 108, 402, 404, 408, 502, 504, and 508.

The media access control layer 180 includes an encryption protocol 183, a TDMA protocol 187, an adaptive power control protocol 184, a slot assignment protocol 192, and a data rate (DR) adaptation protocol 190. In one implementation of this embodiment, one or more of the encryption protocol 183, an adaptive power control protocol 184, and a slot assignment protocol 192 are not included in the media access control layer 180.

In another implementation of this embodiment, the application layer 150 includes a power-aware module 155 to process transmit-power-control packets received from the access node 100 as described in the 021 application. In yet another implementation of this embodiment, the media access control layer 180 includes a callback mechanism 185, which provides a protocol-independent interface to various system levels 350 in each network node 102-208 as described in the 021 application.

The system levels 350 of the access node protocol stack 140 include an application layer 250, a transmission control protocol (TCP) layer 260, an internet protocol (IP) layer 270, and a media access control (MAC) layer 280. The transmission power control (TPC) protocol layer 256 controls transmission power levels of the access nodes 100, 400 and 500. The application layer 250 is also referred to here as "user-level 250."

The media access control layer 280 includes an encryption protocol 283, a TDMA protocol 287, an adaptive power control protocol 284, a slot assignment protocol 292, and a data rate (DR) adaptation protocol 290. In one implementation of this embodiment, one or more of the encryption protocol 283, an adaptive power control protocol 284, and a slot assignment protocol 292 are not included in the media access control layer 280. The protocols in the media access control layers 180 and 280 are described in more detail below.

In another implementation of this embodiment, the application layer 250 includes a power-aware module (not shown) as described in the 021 application. In yet another implementation of this embodiment, the media access control layer 280 includes a callback mechanism 285 as described in the 021 application.

In one implementation of this embodiment, the access node protocol stack 140 is the same as the network node protocol stack 130. Similarly, in some implementations of this embodiment, one or more of the application layer 250, the transmission control protocol (TCP) layer 260, the internet protocol (IP) layer 270, the media access control (MAC) layer 280, are the same as one or more of the application layer 150, the transmission control protocol (TCP) layer 160, the internet protocol (IP) layer 170, and the media access control (MAC) layer 180, respectively.

In order to best fit the aerospace applications, the DA-TDMA protocols 287 and 187 are customized to provide three QoS categories, which are summarized in Table 1. QoS category high is for deterministic applications, such as real-time control signals and actuator/sensor data, where rapid response is more critical than large volume of data transfer. The deterministic applications specify an application-specified periodicity of data packet and an application-specified number of retries for each data packet and reserve those slots throughout the application life cycle. The application also specifies an application-associated priority value, which is used to allocate a data packet for a high QoS. In one implementation of this embodiment, if the number of reserved time slots exceeds a selected high-QoS threshold, the data packet is allocated a high QoS.

QoS category of medium is for the real-time applications, such as audio and video data traffic, in which the slot resources are allocated on demand. The real-time applications specify the application-specified data rate, the application-specified delay requirement, and the application-specified number of reserved retries for such data packets. The DA-TDMA media access control layer performs the slot assignment according to the application requirements and application-associated priority values.

QoS category low is for the non-real-time applications, such as internet browsing and emails, where latency is not critical as long as the data is delivered within the maximum delay period. The non-real time, non-deterministic applications specify the maximum delay requirement, and number of reserved retries.

TABLE 1

| QoS Categories | | | | |
|---|---|---|---|---|
| QoS Category | Name | Applications | Explanation | Input Parameters |
| High | Deterministic | Rapid-response applications, such as engine control signals, actuator/sensor data, etc. | Data packet periodicity is specified by application directly. If necessary, retries can be conducted as long as the slot time permits. | Number of slots in a superframe. |
| Medium | Real-time | Audio, Video, etc. | Retries are reserved in each slot. The number of retries can be specified by applications. Its drawback is waste of bandwidth. Its benefit is that both data rate and delay requirements are guaranteed. | Data rate, delay requirement, number of reserved retries. |
| Low | Non-real-time | Internet browsing, emails, etc. | One Ack is reserved in each slot. Retry is conducted in the following available slot. The access node assigns more slots in the next | Maximum delay and number of retries. |

TABLE 1-continued

QoS Categories

| QoS Category | Name | Applications | Explanation | Input Parameters |
|---|---|---|---|---|
| | | | super-frame as needed. Data speed could be guaranteed on average. | |

Figure 4:
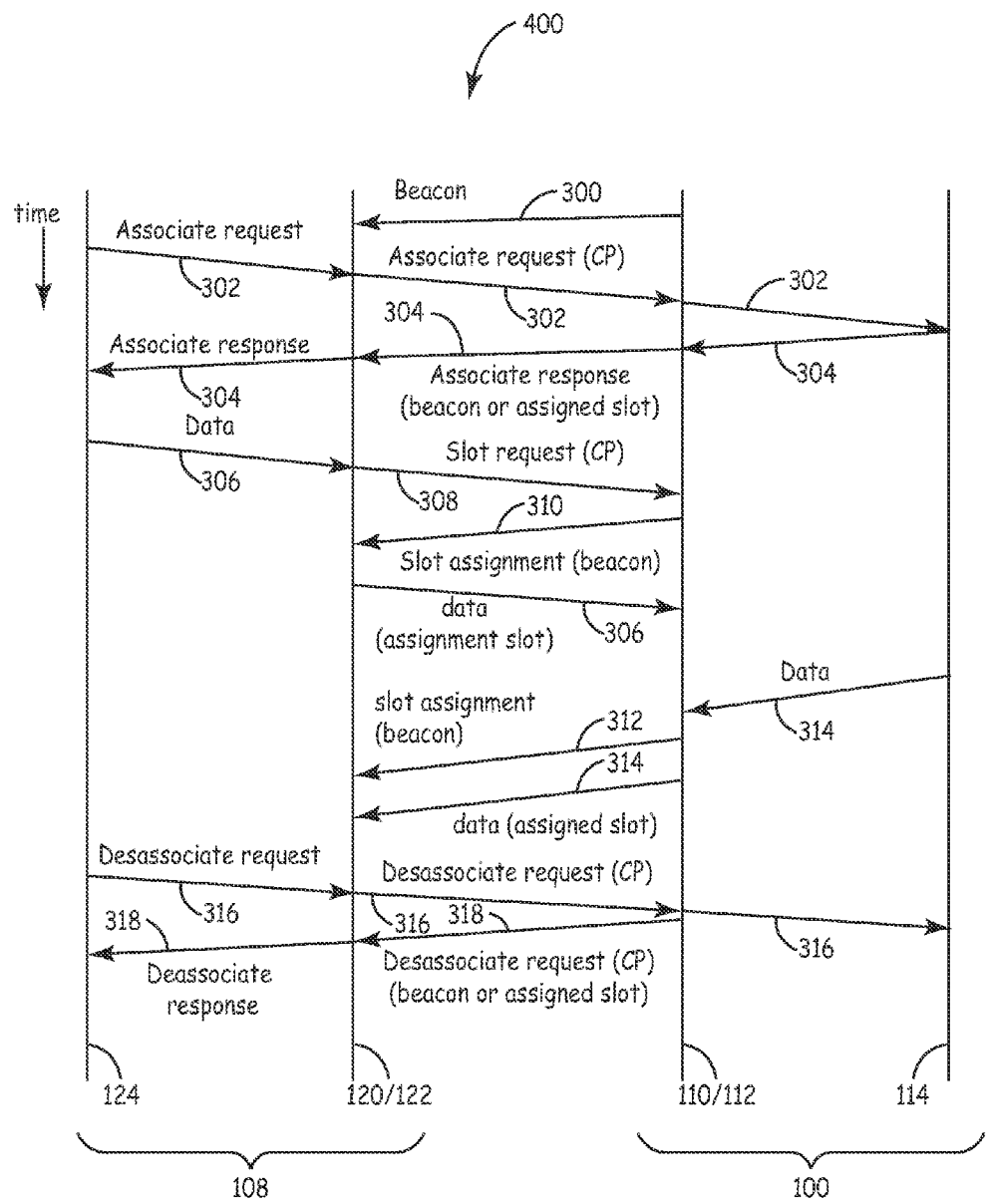
FIG. 4 shows a flow diagram for a basic system operation procedure for wireless dynamic auto-reconfigurable time division multiple access managed network in accordance with the present invention.

FIG. 4 shows a flow diagram 400 for a basic system operation procedure for network 10 in accordance with the present invention. The description related to flow diagram 400 is applicable to other network embodiments including network 11. The direction of the arrows represent the direction of transmission of a signal. Time progresses in the downward vertical direction. The vertical lines labeled 114, 110/112, 120/122 and 124 are indicative of the processor 114 in the access node 100, the receiver/transmitter 110/112 in the access node 100, the receiver/transmitter 120/122 in the network nodes 102-108 and the processor 124 in the network nodes 102-108, respectively, as shown in FIG. 1. The description of the flow diagram 400 is made with reference to an exemplary network node 108 and the access node 100 of the network 10 in FIG. 1. In this exemplary case, the signals generated at the access node 100 are sent from the transmitter 112 to the receiver 120 in the network node 108. The signals generated at the network node 108 are sent from the transmitter 122 to the receiver 110 in the access node 100.

The access node 100 periodically broadcasts a beacon signal 300. The period of sequential broadcast beacon signals defines a super-frame. On power up, network node 108 searches for the broadcast beacon signal 300, detects the signal 300 at the receiver 120 and synchronizes the network node 108 to the access node clock. The beacon signal 300 has the information of slot assignment for all the network nodes 102-108 that are communicatively coupled to the access node 100.

When the network node 108 enters the network 10, it randomly picks a time slot during the contention period (CP) and sends an association request 302 to the access node 100. In one implementation of this embodiment, the new network node 108, implements a Slotted Aloha technique to obtain initial network access. Upon receiving the association request 302, the access node 100 authenticates the network node 108 and sends an association response 304 message back to the network node 108. If the network node 108 is accepted to join the network 10, the access node 100 also assigns a network address to the network node 108.

When the network node host, such as the processor 124 at the network node 108 has data 306 to send to the access node 100, the network node 108 first sends a slot request message 308 to the access node 100 during the contention period. The access node 100 then sends back slot assignment information 310 through the beacon signal 310. The network node 108 recognizes the assigned slot and transmits the data 306 in the assigned slot of the super-frame.

Likewise, when the access node 100 sends data 314 to the network node 108, it first sends the assigned slot information 312 for the network node to receive the data 314 to the network node 108. The assigned slot information 312 is sent in the beacon signal 300. Then the data 314 is sent in the assigned slot from the access node 100 to the network node 108 and the network node 108 reads the data at the assigned time slot.

When a network node 108 leaves the network 10, the processor 124 sends a de-association request 316 to the access node 100. The access node 100 then sends the de-association response 318 to processor 124 in the network node 108. Then the network node 108 powers off.

FIG. 5 is a block diagram of a super-frame 330 and a slot duration structure 331 in accordance with the present invention. A super-frame 330 comprises of the beacon 335, a contention free period (CFP) 340, and a contention period (CP) 345. In the contention free period 340, the time slots are reserved for the assigned network node, while in contention period, the time slots are open to all nodes. In one implementation of this embodiment, the contention free period and contention period are interleaved.

FIG. 5i is a slot duration structure 331 in accordance with the present invention. The slot duration structure 331 comprises two guard times 350 at each end of the slot duration structure 331, a data packet 355, and an acknowledgement window 360. The guard time 350 is determined by the super-frame time and the system frequency tolerance. The data packet duration is determined by the current data rate and the size of the data packet 355. The duration of the acknowledgement packet 360 is also determined by the data rate and the acknowledgement packet size.

The slot duration $T_{slot}$ is calculated as $$T_{slot} = T_{Guard} + T_{packet} + T_{ACK} + T_{Guard} \qquad (1)$$

where $T_{Guard}$ is the guard time, $T_{packet}$ is the data packet duration, and $T_{ACK}$ is the duration of an acknowledgement packet. For different physical layers, different data rates, and different modulation types, the slot calculation varies.

FIG. 6 is an exemplary physical layer convergence procedure (PLCP) frame format. An exemplary time slot computation is described with reference to this exemplary data packet that is configured as a physical layer convergence procedure (PLCP) frame format having a 54 Mbps data rate. In one implementation of this embodiment, the 1534-byte data packet has a 54 Mbps data rate according to the Institute of Electrical and Electronics Engineers 802.1g standards.

The slot duration for one PSDU packet of 1534 bytes is calculated as follows.

$$T_{packet} = T_{preamble} + T_{signal} + T_{sym} \times \left\lceil \frac{16 + 6 + PSDU \times 8}{N_{DBPS}} \right\rceil$$

where
$T_{preamble}$=16 μs is the preamble time,
$T_{signal}$=4 μs is the signaling period,
$T_{sym}$=4 μs is the symbol period,
$N_{DBPS}$=216 is the number of data bits per symbol.

The notation $\lfloor x \rfloor$ denotes the minimum integer, which is no less than x. So the packet duration is calculated as $T_{packet}$=248 μs. By the same logic, the ACK (14 bytes) duration is calculated as $T_{ACK}$=24 μs.

If the super-frame duration is set to 300 ms, and the maximum frequency offset tolerance is 30 ppm, and the worst case time offset is 9 μs. To provide some safety margin, the guard time is chosen as $T_{Guard}$=10 μs. Substituting all the values into Equation (1), the slot duration required by one data packet of 1534 bytes and one acknowledgement packet of 14 bytes is 292 μs.

Figure 7:
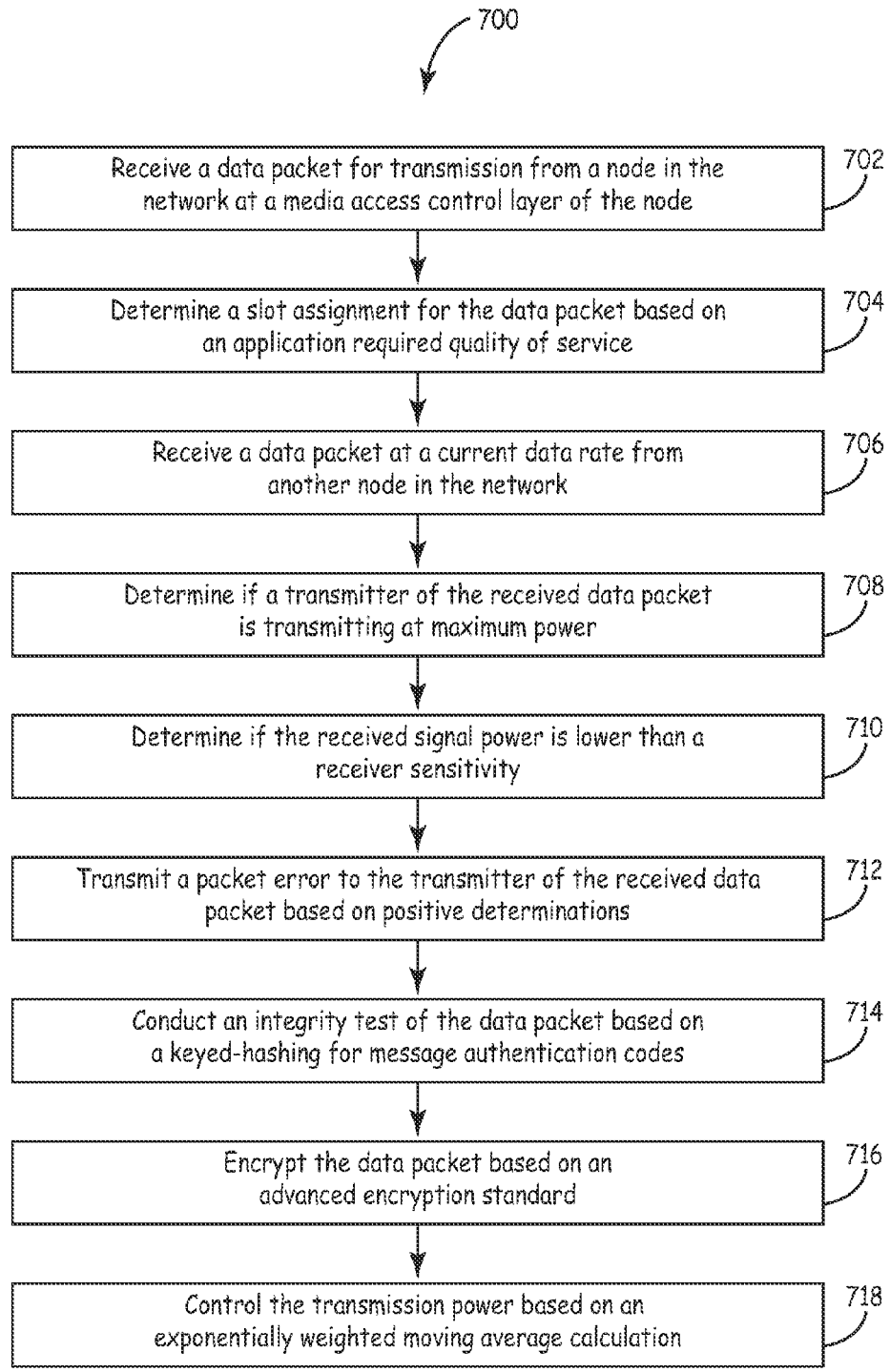
FIG. 7 is a flow diagram of a method to manage a network in accordance with the present invention.

FIG. 7 is a flow diagram of a method 700 to dynamically reconfigure a network in accordance with the present invention. The particular embodiment of method 700 shown in FIG. 7 is described here as being implemented in the access node protocol stack 140 in an access node 100 and the network node protocol stack 130 in the network nodes 102-108 as described above with reference to FIGS. 1A and 3. The particular embodiment of method 700 shown in FIG. 7 is described here as being implemented in a super-frame 330 described above with reference to FIGS. 5 and 5i. A program-product comprising program instructions is embodied on software 220 in the access node 100 and on software 121 in the network nodes 102-208. The program instructions are operable to cause processors 114 and 124 in the respective access node 100 and the network nodes 102-108 to perform the functions described as being carried out by the protocols in the respective access node protocol stack 140 and the network node protocol stack 130. Such program instructions are stored on or otherwise embodied on one or more items of storage media 115.

At block 702, a data packet for transmission from a node in the network is received at a media access control layer of the node. The media access control layer is enabled for time division multiple access. In one implementation of this embodiment, the media access control layer is enabled for time division multiple access and carrier sensed multiple access. In an exemplary implementation of this embodiment, the data packet 355 to be transmitted from the network node 102 in the network 10 is received at the media access control layer 180 of the network node 102 from the application layer 150 of the network node 102.

At block 704, a slot assignment for the data packet in a super-frame is determined based on an application required quality of service. The application required quality of service is determined based on a number of slots required by the data packet, an application-specified data rate, an application-specified delay requirement and an application-specified number of reserved retries, and/or application-associated priority values for the data packet. In an exemplary implementation of this embodiment, processor 124 in the network node 102 executes software 121 at the media access control layer 180 to determine a slot assignment for the data packet 355 in a super-frame 330. Additional details about determining slot assignment are described below with reference to methods 800 and 900 of FIGS. 8 and 9, respectively. In one implementation of this embodiment, the slot assignment provides access to a channel for the data packet according to one of IEEE 802.11 standards (2004), IEEE 802.15.4 standards (2006), and a combination of IEEE 802.11 standards and IEEE 802.15.4 standards.

At block 706, a data packet is received at a current data rate from another node in the network. In an exemplary implementation of this embodiment, the data packet 355 sent from transmitter 112 in the access node 100 of the network 10 at a current data rate and is received at the receiver 120 in the network node 102 of the network 10.

At block 708, the processor determines if a transmitter of the received data packet is transmitting at maximum power. In an exemplary implementation of this embodiment, processor 124 in the network node 102 executes software 121 at the media access control layer 180 to determine if the transmitter 112, which sent the data packet 355 received at block 706, is transmitting at maximum power.

At block 710, the processor determines if the received signal power is lower than a reliable-detection-power threshold. In one implementation of this embodiment, the reliable-detection-power threshold is the receiver sensitivity. In an exemplary implementation of this embodiment, processor 124 in the network node 102 executes software 121 at the media access control layer 180 to determine if the received signal power is lower than a reliable-detection-power threshold of the receiver 120 in the network node 102.

At block 712, the node transmits a packet error to the transmitter of the received data packet based on positive determinations being made at blocks 708 and 710. The transmitter of the data packet does not retransmit the data packet at the current data rate based on the packet error. In an exemplary implementation of this embodiment, the receiver 120 of the network node 102 transmits a packet error to the receiver 110 at the access node 100 based on positive determinations being made at blocks 708 and 710. After the packet error is received at the access node 100, the transmitter 112 in the access node 100 does not retransmit data packets at the current data rate to the network node 102. In one implementation of this embodiment, the processes of block 706 to block 712 outline the process implemented by the data rate adaptation protocol 190 and 290 shown in FIG. 3.

At block 714, the node conducts an integrity test of the data packet based on a keyed-hashing for message authentication codes. In an exemplary implementation of this embodiment, the processor 124 in the network node 102 executes software 121 at the media access control layer 180 to conduct an integrity test of the data packet 355 based on a keyed-hashing for message authentication codes.

At block 716, the processor in a node encrypts the data packet based on an advanced encryption standard. In an exemplary implementation of this embodiment, the processor 124 in the network node 102 executes software 121 at the media access control layer 180 to encrypt the data packet 355 based on an advanced encryption standard. In one implementation of this embodiment, the processes of block 714 to block 716 outline the process implemented by the encryption protocol 183 and 283 shown in FIG. 3.

At block 718, the processor in a node adaptively controls the transmission power based on an exponentially weighted moving average calculation. In an exemplary implementation of this embodiment, the processor 124 in the network node 102 performs an exponentially weighted moving average calculation to adaptively control the transmission power. In one implementation of this embodiment, the process of block 718 outline the process implemented by the adaptive power control protocol 184 and 284 shown in FIG. 3.

Figure 8:
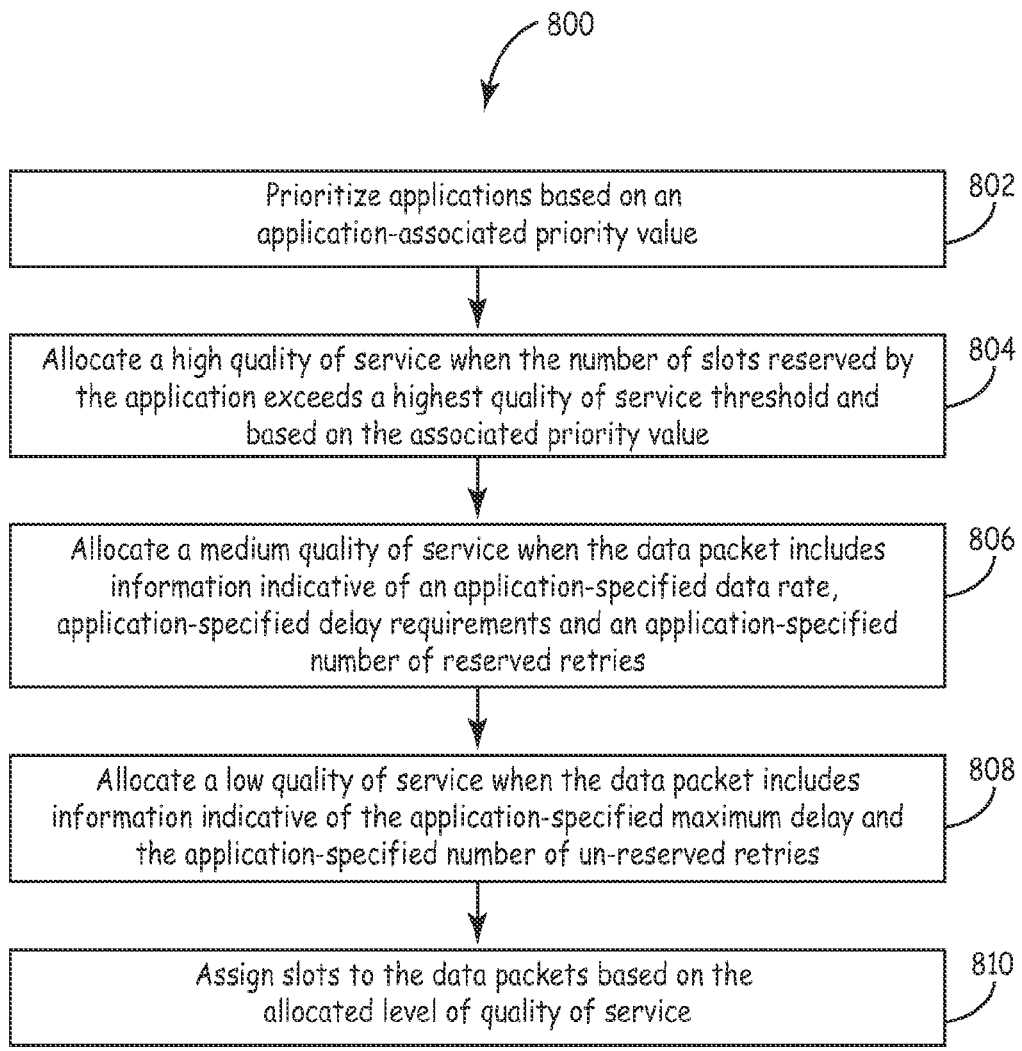
FIG. 8 is a flow diagram of one embodiment of a method to determine slot assignment for data packet in accordance with the present invention.

FIG. 8 is a flow diagram of one embodiment of a method 800 to determine slot assignment for a data packet in accordance with the present invention. The particular embodiment of method 800 shown in FIG. 8 is described here as being implemented in the access node protocol stack 140 in an access node 100 and the network node protocol stack 130 in the network nodes 102-108 as described above with reference to FIGS. 1A and 3. The particular embodiment of method 800 shown in FIG. 8 is described here as being implemented in a super-frame 330 described above with reference to FIGS. 5 and 5i. A program-product comprising program instructions is embodied on software 220 in the access node 100 and on software 121 in the network nodes 102-208. The program instructions are operable to cause processors 114 and 124 in the respective access node 100 and the network nodes 102-108 to perform the functions described as being carried out by the protocols in the respective access node protocol stack 140 and the network node protocol stack 130. Such program instructions are stored on or otherwise embodied on one or more items of storage media 115. In one implementation of this embodiment, method 800 outlines the process implemented by the slot assignment protocol 192 and 292 and the TDMA protocol 187 and 287 shown in FIG. 3.

At block 802, the node prioritizes applications based on an application-associated priority value. In an exemplary implementation of this embodiment, the network node 102 prioritizes applications based on an application-associated priority value.

At block 804, the node allocates a high quality of service when the number of slots reserved by the application exceeds a highest quality of service threshold and based on the application-associated priority value. In an exemplary implementation of this embodiment, the processor 124 in the network node 102 executes software 121 to allocate a high quality of service to the data packet 355 when the number of slots reserved by the application exceeds a highest quality of service threshold and based on the application-associated priority value.

At block 806, the node allocates a medium quality of service when the data packet includes information indicative of an application-specified data rate, application-specified delay requirements and an application-specified number of reserved retries. In an exemplary implementation of this embodiment, the processor 124 in the network node 102 executes software 121 to allocate a medium quality of service to the data packet 355 when the data packet 355 includes information indicative of an application-specified data rate, application-specified delay requirements and an application-specified number of reserved retries.

At block 808, the node allocates a low quality of service when the data packet includes information indicative of the application-specified maximum delay and the application-specified number of un-reserved retries. In an exemplary implementation of this embodiment, the processor 124 in the network node 102 executes software 121 to allocate a low quality of service to the data packet 355 when the data packet 355 includes information indicative of the application-specified maximum delay and the application-specified number of un-reserved retries.

At block 810, the node assigns slots to the data packets based on the allocated level of quality of service. The data packet is transferred with guaranteed quality of service if a guarantee is required. In an exemplary implementation of this embodiment, the processor 124 in the network node 102 executes software 121 to assigns slots to the data packets, such as data packet 355, based on the allocated level of quality of service.

Figure 9:
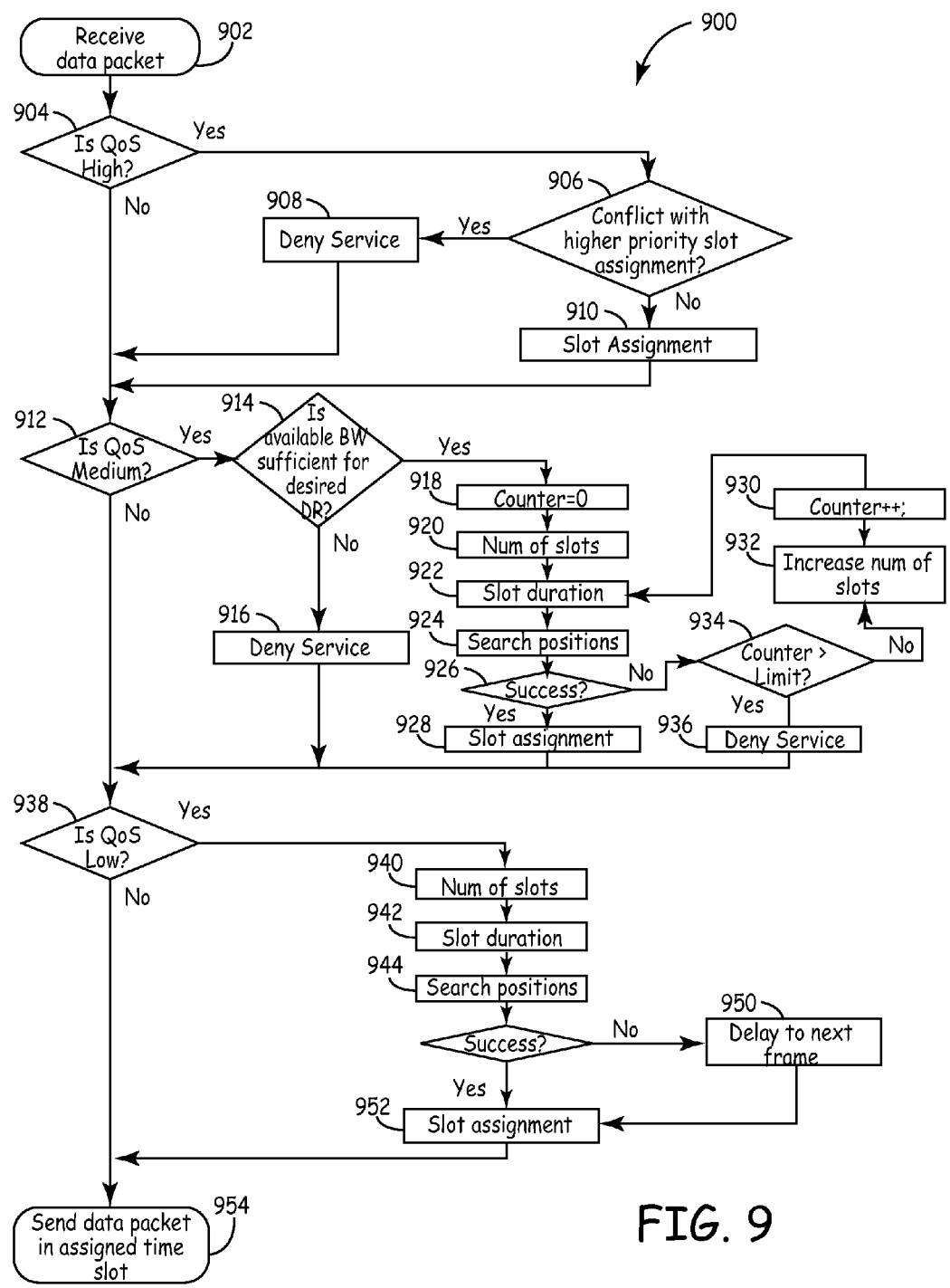
FIG. 9 is a flow diagram of one embodiment of a method to assign slots for data based on the quality of service of the data in accordance with the present invention.

FIG. 9 is a flow diagram of one embodiment of a method 900 to assign slots for data based on the quality of service of the data in accordance with the present invention. The flow diagram in FIG. 9 shows more detail regarding the steps required to implement method 800 described above with reference to FIG. 8. The particular embodiment of method 900 shown in FIG. 9 is described here as being implemented in the access node protocol stack 140 in an access node 100 and the network node protocol stack 130 in network nodes 102-108 as described above with reference to FIGS. 1A and 3. The particular embodiment of method 900 shown in FIG. 9 is described here as being implemented in a super-frame 330 described above with reference to FIGS. 5 and 5i. A program-product comprising program instructions is embodied on software 220 in the access node 100 and on software 121 in the network nodes 102-208. The program instructions are operable to cause processors 114 and 124 in the respective access node 100 and the network nodes 102-108 to perform the functions described as being carried out by the protocols in the respective access node protocol stack 140 and the network node protocol stack 130. Such program instructions are stored on or otherwise embodied on one or more items of storage media 115.

At block 902, a data packet 355 is received at a media access control layer 80 from the application layer 50 for transmission at a node 102. At block 904, the processor 124 in the network node 102 executes software 121 to determine if the quality of service is high. For the high quality of service category, which is a deterministic category, the slot assignment is calculated based on the data packet length and packet periodicity specified by the application. Applications are prioritized according to an application-associated priority value. Applications with high priority value have the right to reserve the slots first. Applications with equal priority use a random ordering to make slot reservation. Once it is determined the quality of service is high for the data packet 355, the processor 124 in the network node 102 executes software 121 to determine if the data packet 355 is in conflict with a higher priority slot assignment (block 906). If there is a conflict, the data packet 355 is denied service (block 908). If there is not a conflict, the data packet 355 is given a slot assignment based on the calculated data packet length and packet periodicity specified by the application (block 910) and the data packet is sent in the assigned time slot (block 954).

If the quality of service for the data packet 355 was not high, then at block 912, the processor 124 in the network node 102 executes software 121 to determine if the quality of service is medium. The medium quality of service category is a real-time category. If the data packet requires falls in the medium quality of service category, the processor 124 in the network node 102 executes software 121 to determine if sufficient bandwidth is available for the desired data rate (block 914).

If there is not sufficient bandwidth, the data packet 355 is denied service (block 916). If there is sufficient bandwidth, the processor 124 in the network node 102 sets a counter to zero (block 918), and determines the number of slots $n_s$ that are required per super-frame 330 at block 920 for the data packet 355. For real time applications, delay requirement is usually important. The minimum number of slots $N_m$ is calculated as $$N_m = \left\lceil \frac{SF}{\text{delay}} \right\rceil$$

where SF is the super-frame duration, and the notation delay means the application delay requirement. The application required data rate is represented by $R_{req}$ and the maximum packet size is denoted by max_Packet_size. The number of packets per super-frame 330 $N_p$ is calculated as $$N_p = \lfloor R_{req} \times SF / \text{max\_Packet\_size} \rfloor$$

The number of slots per super-frame 330 should be the biggest number of $N_m$ and $N_p$, i.e., $n_s = \max\{N_m, N_p\}$.

At block 922, the processor 124 calculates a slot duration as described above with reference to FIGS. 5, 5i and 6. Then the processor 124 searches for available slot positions (block 924), and determines if a slot position is located (block 926). The processor 124 calculates desired time epoch or start time point, $t_n$, of the beginning of the $n^{th}$ slot position as $$t_n = t_1 + (n-1)\frac{SF}{n_s}, \quad n = 2, 3, \ldots, n_s$$

where $t_1$ is the start time point of the beginning of the first slot.

The processor 124 searches the time slots closest to the desired slot positions in the available time unit set. If the slot position was successfully located, the data packet 355 is assigned a slot (block 928) and the data packet 355 is sent in the assigned time slot (block 954). In one implementation of medium quality of service services, the retries are reserved in every slot.

If the slot position was not successfully located, the processor 124 determines if the value in the counter exceeds a pre-selected counter limit (block 934). After certain number of un-successful slot allocations, the application is informed that the requested service cannot be provided. Thus, if the value in the counter exceeds the pre-selected counter limit, the data packet 355 is denied service (block 936). If the value in the counter does not exceed the pre-selected counter limit, the processor 124 increases the number of slots $n_s$ (block 932), the counter is increased by one (block 930) and the flow proceeds back to block 922. The cycle continues until the data packet is assigned a slot at block 928 or denied service at block 936.

If the quality of service for the data packet 355 was not high or medium, then at block 938, the processor 124 in the network node 102 executes software 121 to determine if the quality of service is low. In one implementation of this embodiment, the processor processes the data packet 355 as a low quality of service, by default, if the quality of service for the data packet 355 is not high or medium. The low quality of service category is a non-real-time quality of service. If the quality of service is low, the processor 124 determines the number of slots $n_s$ per super-frame 330 (block 940), which is:

$$n_s = \lfloor \text{data\_size}/\text{max\_Packet\_size} \rfloor$$

The notation data_size denotes the application data size.

At block 942, the processor 124 calculates slot duration as described above with reference to FIGS. 5, 5i and 6. At block 944, the processor 124 searches the time slots in the available time units in the super-frame 330 and determines if a slot position is located (block 948). If the slot position is successfully located, the data packet 355 is assigned a time slot (block 952) and the data packet 355 is sent in the assigned time slot (block 954). If the slot position was not successfully located, the unallocated slots are delayed to the next super-frame 330 (block 950).

For low quality of service services, the retries are not reserved in every slot. For each application, only one transmission is conducted in one slot. If the transmission fails, the retry is conducted immediately in the next available slot. The number of total retries in each super-frame 330 is compensated for in the next super-frame 330. The rest of the unassigned time units, plus the reserved contention period, are used for random access.

When there are insufficient time slots to accommodate a new and higher level application, priority-based preemption is used to preempt the existing low-priority applications. In one implementation of this embodiment, the priority of each application is specified by a value from 0 to 7. The value 7 corresponds to the highest priority and the value 0 corresponds to the lowest priority. The preemption takes place only if: the priority of the new application is higher than that of one or multiple existing applications; and the total time slots of the lower priority applications are equal to or more than the required time slots of the new application. When preemption occurs, a minimal number of applications with the lowest priorities are torn down, and the new application is established.

Additional details about the adaptive power control protocols 184 and 284 in the media access control layers 180 and 280, respectively, of FIG. 3 are now described. In order to reduce the waste of resource and improve the system throughput, the adaptive power control protocols 183 and 283 uses a packet error method with signal strength complement. For different transmission rates, the required signal-to-noise-ratio (SNR) with certain bit error rate (BER) is different. In general, higher data rates require higher received signal power. For example, the reliable-detection-power threshold for 54 Mbps data rate is about −70 dBm, while the reliable-detection-power threshold for 1 Mbps data rate is about −91 dBm.

The transmitter does not try the data rates of $r_m$ and above when the sender is transmitting at its maximum power and the received signal power is still lower than the reliable-detection-power threshold of certain data rate $r_m$. In this way, the failures due to attempting data rates equal to or higher than $r_m$ are eliminated. The power levels in the following equations are in units of dB. The transmitter sends out a data packet and information about its current transmission power $P_{Tx}$. After receiving the data packet, the receiver measures the received signal strength, RSS, and estimates the path loss as $PL = P_{Tx} - RSS$.

The channel path loss follows a log normal distribution with average of $\mu_{PL}$ and standard deviation of $\sigma_{PL}$. $RSS_{min}$ is the minimum required received signal strength at the receiver. In order to prevent the received signal lower than $RSS_{min}$ with 99% confidence level, the optimal transmission power $P_{TxOpt}$ for the next transmission is calculated as:

$$P_{TxOpt} = \mu_{PL} + RSS_{min} + 3\sigma_{PL}$$

At the receiver, the path loss of the $n^{th}$ received packet is calculated as $$PL(n) = P_{Tx}(n) - RSS(n)$$

Using the exponentially weighted moving average (EWMA) method, the average path loss PL_ave(n) after n received packets is recursively estimated as $$PL\_ave(n) = \alpha PL\_ave(n-1) + (1-\alpha)PL(n)$$

By the same logic, an estimate of the variance of the path loss is:

$$PL\_var(n) = \beta PL\_var(n-1) + (1-\beta)[PL(n) - PL\_ave(n)]^2$$

As $\alpha$ and $\beta$ increase, the estimation variances decrease and the model adaptation speed get slower. Usually parameters of $\alpha$ and $\beta$ are chosen between 0.7 to 0.9. The optimal transmission power after the $n^{th}$ received packet is calculated as $$P_{TxOpt}(n) = PL\_ave(n) + RSS_{min} + 3\sqrt{PL\_var(n)}$$

The receiver sends out the optimal transmission power $P_{TxOpt}(n)$ to the transmitter, and the transmitter sets the transmission power to $P_{TxOpt}(n)$ in the next transmission. When the path loss varies in a wider range, the cushion value of $3\sqrt{\overline{PL\_var(n)}}$ is also large enough to protect packet loss. When the path loss varies very little, the cushion value of $3\sqrt{\overline{PL\_var(n)}}$ is small and some transmission power is saved.

Additional details about the encryption protocols 183 and 283 in the media access control layers 180 and 280, respectively, of FIG. 3 are now described. In order to prevent eavesdropping, spoofing, masquerading, and replay attacks, the security in the DA-TDMA is ensured by three security components: a key management; an integrity; and encryption.

The nodes in the systems 10 and 11 implement three keys: a shared secret key; an authentication key; and an encryption key, which are used in the DA-TDMA system. The shared secret key is manually distributed to both access node 100 and network nodes 102-508 during hardware initialization. For the service advertisement broadcasted by the access node 100 and association request from the network nodes 102-508, there are two security options.

The first option is open system, in which there are no integrity check and no encryption. The advantage of this open system is its simplicity. However, the open system is susceptible to eavesdropping, masquerading, and man-in-the-middle attacks. It is used in the applications with low security requirements.

The second security option for the advertisement and initial association is secured system, in which the integrity check is conducted using HMAC (keyed-hashing for message authentication codes) and the encryption is done through advanced encryption standard (AES). The key used for both the HMAC integrity check and the AES encryption during initial secure association is the shared secret key. HMAC is essentially an iterated cryptographic hash function. The popular candidate hash functions for HMAC are SHA-1, MD-5, and RIPEMD-128/160. Even though MD-5 alone has been found to fall prey to collision search attacks, the HMAC with MD-5 is not vulnerable to this collision search attacks. Since SHA-1 is the widely accepted hash function, HMAC with SHA-1, i.e., HMAC-SHA1, is employed for integrity check in the secured system.

The authentication key $K_A$ and encryption key $K_E$ used within each session are derived using Diffie-Hellman exchange as known in the art. The Diffie-Hellman exchange allows two users to derive a secret key through messages over an insecure channel. The Diffie-Hellman exchange protocol has two system parameters p and g that are hard-coded in both access node and network nodes. Parameter p is a prime number and parameter g is an integer less than p.

After receiving the association request from a network node, the access node generates a random private value a, and send the shared random value $r_a = g^a$ mod p to the network node. The network node also generates a random private number b, and send the shared random number $r_b = g^b$ mod p to the access node. The access node derives its secret key as $(r_b)^a$ mod p and the network node calculates its secret key as $(r_a)^b$ mod p. It is well known that the secret keys derived by both access node and network node are the same key, i.e., $k = (g^b \bmod p)^a \bmod p = (g^a \bmod p)^b \bmod p$. Since the HMAC integrity check and AES encryption are performed in the Diffie-Hellman message exchange, the system is automatically protected from the man-in-the-middle attacks.

For application data packets, both integrity check and encryption employ symmetric key cryptography. The integrity check for data packets also uses HMAC-SHA1 with authentication session key $K_A$. The encryption is done using AES with encryption session key $K_E$. The block AES is transformed into stream AES using CTR (counter) mode. Frame counter is used for both transmission and receive directions. A session is forced to terminate at counter rollover.

Thus systems 10 and 11 which include network protocol stacks 130 or 140 as described in FIG. 3, have four key advantages of high throughput, guaranteed quality of service, auto-adaptation and seamless operation over various physical platforms, and efficient energy conservation.

The wireless DA-TDMA managed networks, such as exemplary networks 10 and 11, employ deterministic slot scheduling to avoid the virtual carrier sensing mechanism and thereby reduce control overhead significantly. The overall throughput of CSMA decreases as the number of nodes in the network grows over a certain boundary level. However, the throughput of TDMA does not decrease as the number of nodes increases. Such dynamic TDMA improves the throughput by almost 20% on average with respect to 802.11e.

In contention-based CSMA MAC systems, the QoS cannot be guaranteed. DA-TDMA is a deterministic MAC algorithm and the QoS is guaranteed. The DA-TDMA networks, such as exemplary networks 10 and 11, include media access control layers that run over different physical layer platforms such as 802.11 and 802.15.4 radios. The wireless DA-TDMA management network is adaptable to new platforms, as new physical hardware technologies are developed, with minor modifications of radio interface convergence.

In 802.11 and 802.15.4 wireless networks, there are four major sources of energy waste at the MAC layer: collisions, overhearing, control overhead, and idle listening. Collision takes place when a data packet is corrupted with another data packet and retransmissions have to be conducted. So collisions increase both energy consumption and response latency. Overhearing happens when a node has to receive data packets destined to other nodes. Control messages also consume bandwidth and energy, which are called control overhead. Idle listening requires a node to listens to a channel for possible traffic, which is not actually sent. In order to mitigate the overhearing and idle listening problems in the current 802.11 protocol, wireless DA-TDMA management networks include nodes that only wake up during beacon and assigned time slots. The node is set to sleep mode during the rest of the super-frame. So overhearing and idle listening is completely avoided in this described proposed wireless DA-TDMA management network. In the event that a node misses a beacon signal, the node keeps listening until it receives the next beacon signal. In this described wireless DA-TDMA management network, virtual sensing is not needed, so the RTS and CTS control overheads are saved. Since DA-TDMA is not a contention-based MAC as CSMA is, collisions are eliminated through scheduling in DA-TDMA. Therefore, the DA-TDMA is more energy efficient than the CSMA, which is used in current 802.11 and 802.15.4. In addition, the tightly-bounded, adaptive, transmission power control of this described wireless DA-TDMA management network also helps saving transmission power under various time-varying channel environments.

Rate adaptation and transmission power control described herein achieve two different objectives: the first objective is to maximize the data rate for a given range by changing power while the second objective is to minimize the power to get a given range. The constraint for TPC algorithm is to minimize transmission power while achieving the QoS demand on data rate by the application. In this manner, the rate adaptation and TPC compliment each other.

The embodiments described herein are capable of supporting multiple types of physical layers and are capable of automatically detecting the underlying physical layer and using the appropriate super-frame structure for that physical layer. Additionally, the embodiments described herein are capable of satisfying the bandwidth requirements of high priority applications by taking away slots allocated to a low priority application, as needed. Additionally, the embodiments described herein are capable of running the media access control layer on any standard or proprietary physical layer as long as the necessary physical layer parameters are accessible and controllable.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method to dynamically reconfigure a network, the method comprising:
   receiving a data packet for transmission from a node in the network at a media access control layer of the node, wherein the media access control layer is enabled for time division multiple access;
   determining a slot assignment for the data packet based on an application required quality of service, wherein the application required quality of service is determined based on at least one of a number of slots required by the data packet, an application-specified data rate, an application-specified delay requirement and an application-specified number of reserved retries, and application-associated priority values for the data packet;
   receiving a data packet at a current data rate from another node in the network;
   determining if a transmitter of the received data packet is transmitting at maximum power;
   determining if received signal power is lower than a reliable-detection-power threshold; and
   transmitting a packet error to the transmitter of the received data packet based on positive determinations.

2. The method of claim 1, wherein the transmitter does not retransmit the data packet at a data rate exceeding the current data rate based on the packet error.

3. The method of claim 1, further comprising:
   conducting an integrity test of the data packet based on a keyed-hashing for message authentication codes; and
   encrypting the data packet based on an advanced encryption standard.

4. The method of claim 1, further comprising:
   adaptively controlling the transmission power based on an exponentially weighted moving average calculation.

5. The method of claim 1, wherein the transmitter does not retransmit the data packet at the current data rate based on the packet error, the method further comprising:
   conducting an integrity test of the data packet based on a keyed-hashing for message authentication codes;
   encrypting the data packet based on an advanced encryption standard; and
   adaptively controlling the transmission power based on an exponentially weighted moving average calculation.

6. The method of claim 1, wherein determining a slot assignment comprises:
   assigning the slot assignment based on a calculated data packet length and a data packet periodicity specified by the application.

7. The method of claim 1, wherein determining a slot assignment comprises:
   determining if sufficient bandwidth is available for a data rate;
   determining a number of slots required per super-frame;
   calculating a slot duration;
   calculating a desired time epoch to determine a desired time slot;
   searching for a time slot closest to the desired time slot; and
   assigning the time slot based on the searching.

8. The method of claim 1, wherein determining a slot assignment comprises:
   determining a number of slots required per super-frame;
   calculating a slot duration;
   searching the time slots in the available time units in the super-frame;
   determining if a slot position is located; and
   assigning a time slot based on the determination the slot position is located.

9. The method of claim 1, wherein determining a slot assignment for the data packet comprises:
   prioritizing applications based on an application-associated priority value;
   allocating a high quality of service when a number of slots reserved by the application exceeds a highest quality of service threshold and based on the application-associated priority value;
   allocating a medium quality of service when the data packet includes information indicative of an application-specified data rate, application-specified delay requirements and an application-specified number of reserved retries;
   allocating a low quality of service when the data packet includes information indicative of the application-specified maximum delay and the application-specified number of un-reserved retries; and
   assigning slots to the data packets based on the allocated level of quality of service, wherein the data packet is transferred with guaranteed quality of service if a guarantee is required.

10. The method of claim 1, the method further comprising:
    accessing a channel for the data packet according to one of IEEE 802.11 standards, IEEE 802.15.4 standards, and a combination of IEEE 802.11 standards and IEEE 802.15.4 standards.

* * * * *